C. L. BATCHELOR.
BED.
APPLICATION FILED OCT. 25, 1921.

1,415,978.

Patented May 16, 1922.

INVENTOR
CHARLES L BATCHELOR
BY C. F. Blake
ATTY

UNITED STATES PATENT OFFICE.

CHARLES L. BATCHELOR, OF PORTLAND, OREGON.

BED.

1,415,978. Specification of Letters Patent. Patented May 16, 1922.

Application filed October 25, 1921. Serial No. 510,218.

*To all whom it may concern:*

Be it known that I, CHARLES L. BATCHELOR, a citizen of the United States, residing at Portland, county of Multnomah, State of Oregon, have invented certain new and useful Improvements in Beds, of which the following is a specification.

My invention relates to beds in general, and particularly to beds used for camping purposes, especially with automobiles, the object being to provide a bed adapted to be attached to an automobile and that may be unfolded for use or folded for transportation without detaching the bed from the automobile, and also to provide a covering case for the bed in transportation that may be easily converted into a pillow when the bed is in use without detaching said case from the automobile.

I accomplish the above object by means of the construction illustrated in the accompanying drawing, which is a part of this application for Letters Patent, like characters of reference indicating like parts throughout the several views thereof, and in which.

Figure 1:
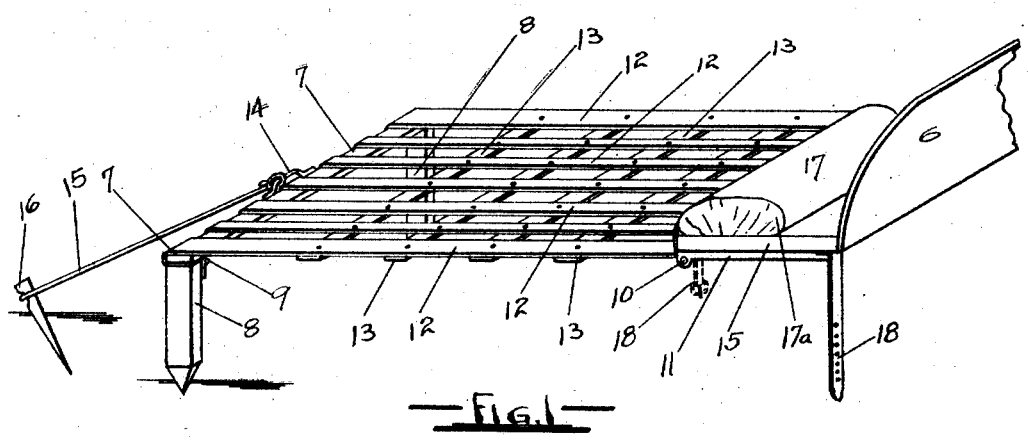
Fig. 1 is a perspective view of my device, ready for use.

My device is attached to the running board of the automobile, said running board being shown at 5 and the running board shield at 6 in the drawing. The running board 5 serves as the head of my bed, and for the foot I provide a transversely disposed bar 7 supported by legs 8. Said legs 8 are hinged at 9 to said bar 7 so that when the bed is folded for transportation the legs lie upon the bar 7, and when set up for use the legs are as shown in Fig. 1.

A rod 10 is secured to the running board 5 by means of suitable brackets 11, said rod being beneath the running board and adjacent and parallel to the edge thereof.

A pad supporting body is formed of suitable strips of material secured at one end thereof to said rod 10, and at the other end thereof to the bar 7. Said strips are shown at 12, and may be of any suitable material, preferably elastic webbing. Secured to said strips at suitable intervals are a plurality of transversely disposed slats 13.

To stretch the strips 12 I provide a bail 14 upon the bar 7 adapted to have a rope or other flexible member 15 stretched between said bail and a stake 16 driven into the ground.

Figure 2:
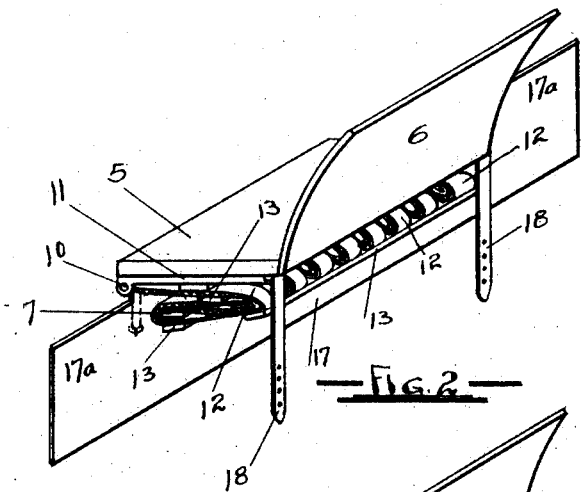
Fig. 2 is a perspective view of the same folded and ready to be stowed for transportation.
Figure 4:
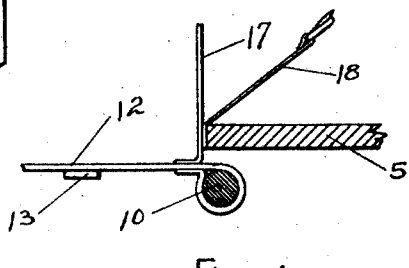
Fig. 4 is a fragmentary view of the detail construction.
Figure 3:
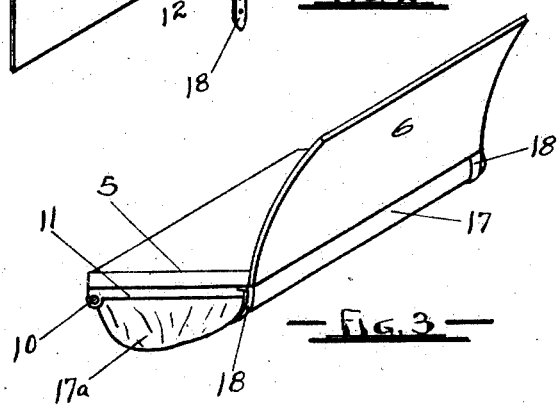
Fig. 3 is a perspective view of the same completely stowed away.

When the bed is not in use it may be rolled up and placed beneath the running board without detaching the strips 12 from the rod 10, as shown in Fig. 2. A cover 17 is provided, attached to the strips 12 adjacent the rod 10 as shown in Fig. 4, and having end tabs 17a. When the bed has been folded as shown in Fig. 2 said cover is tucked about the bed members and the end tabs thereof folded about the ends of the bed members, thus completely enfolding said bed members away from the dust of travel. When thus enfolded within the cover 17 the whole is supported beneath the running board 5 by means of suitable straps 18.

When the bed members are unfolded and placed in position for use the cover may be folded back upon and above the running board and filled with any suitable material, such as hay, straw, clothing or the like, and this forms a pillow as illustrated in Fig. 1.

My device may be made of any size and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. A folding bed supported at one end thereof upon the running board of an automobile and adapted to be folded there-beneath, in combination with a cover attached to said bed and adapted to encase said bed when so folded and to form a pillow casing for said bed when the same is in use.

2. In combination with a foldable bed attached to an automobile running board and foldable therebeneath: a sheet of flexible material secured to said bed adjacent the running board and having end tabs thereon, and adapted to encase said bed when the latter is folded beneath the running board and to form a pillow casing upon the running board when the bed is in use.

In witness whereof I claim the foregoing as my own I hereunto affix my signature in the presence of two witnesses at Portland, county of Multnomah, State of Oregon, this 12th day of Oct., 1921.

CHARLES L. BATCHELOR.

Witnesses:
L. J. ROBINSON,
C. F. BLAKE.